United States Patent
Kozakaya et al.

(10) Patent No.: US 7,324,670 B2
(45) Date of Patent: Jan. 29, 2008

(54) FACE IMAGE PROCESSING APPARATUS AND METHOD

(75) Inventors: Tatsuo Kozakaya, Kanagawa (JP); Mayumi Yuasa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 842 days.

(21) Appl. No.: 10/733,231

(22) Filed: Dec. 12, 2003

(65) Prior Publication Data
US 2004/0136574 A1 Jul. 15, 2004

(30) Foreign Application Priority Data
Dec. 12, 2002 (JP) .......................... P.2002-360226

(51) Int. Cl.
G06K 9/00 (2006.01)
G06K 9/34 (2006.01)

(52) U.S. Cl. .................... 382/118; 382/115; 382/164

(58) Field of Classification Search ........ 382/115–118, 382/154, 164; 358/538
See application file for complete search history.

(56) References Cited

U.S. PATENT DOCUMENTS

| | | | |
|---|---|---|---|
| 6,466,685 B1 * | 10/2002 | Fukui et al. ................. | 382/115 |
| 6,690,814 B1 | 2/2004 | Yuasa et al. | |
| 6,920,236 B2 * | 7/2005 | Prokoski ..................... | 382/115 |
| 7,035,440 B2 * | 4/2006 | Kaku ........................ | 382/115 |
| 7,155,036 B2 * | 12/2006 | Li ................................ | 382/118 |
| 7,212,233 B2 * | 5/2007 | Nakamura ................. | 348/221.1 |
| 7,215,798 B2 * | 5/2007 | Engels et al. ................ | 382/124 |
| 2003/0039378 A1 | 2/2003 | Yuasa et al. | |
| 2004/0213437 A1 * | 10/2004 | Howard et al. ............. | 382/115 |

FOREIGN PATENT DOCUMENTS

| | | |
|---|---|---|
| JP | 59-182689 | 10/1984 |
| JP | 2000-163469 | 6/2000 |
| JP | 2001-331799 | 11/2001 |
| JP | 2002-183734 | 6/2002 |

OTHER PUBLICATIONS

Fan et al. ("Picture/Graphics Classification Using Texture Features," SPIE, vol. 4663, 2002, pp. 81-85).*
Notice of Reasons for Rejection issued by the Japanese Patent Office on Jan. 30, 2007, for Japanese Patent Application No. 2002-360226, and English-language translation thereof.
Yamaguchi et al; "Smartface—A Robust Face Recognition System under Varying Facial Pose and Expression", IEICE Trans. Inf & Syst., vol. E86-D, No. 1, pp. 37-44, Jan. 2003.

* cited by examiner

*Primary Examiner*—Daniel Miriam
*Assistant Examiner*—Yubin Hung
(74) *Attorney, Agent, or Firm*—Finnegan, Henderson, Farabow, Garrett & Dunner, L.L.P.

(57) ABSTRACT

A face image processing apparatus, includes: a face region detecting unit configured to detect a face feature point of a person from a plurality of images picked up by a plurality of imaging units respectively, to detect a face region; a face feature extracting unit configured to extract a face feature from an image of the face region detected by the face region detecting unit; a person recognizing unit configured to calculate a similarity measure based on a face feature of a specific person being previously registered and the face feature extracted by the face feature extracting unit to recognize the person; and an output apparatus which outputs a recognition result in the person recognizing unit.

4 Claims, 11 Drawing Sheets

FACE IMAGE PROCESSING APPARATUS AND METHOD

The present disclosure relates to the subject matter contained in Japanese Patent Application No. 2002-360226 filed Dec. 12, 2002, which is incorporated herein by reference in its entirety.

BACKGROUND OF THE INVENTION

1. Field of the Invention

The present invention relates to an apparatus and a method, for performing a face image processing operation such as a face recognition and a detection of a face direction from entered images by employing a plurality of cameras (multiple cameras).

2. Background Art

Recognition using face images may constitute very useful techniques in view of securities, since there is no risk of lost and forgetfulness, which are different from physical keys and passwords. However, since sizes of faces are changed due to individual differences and furthermore directions of faces are not constant, variations contained in patterns of these faces must be necessarily absorbed in order to execute high-precision recognition. These individual differences are caused by standing positions of users and back shapes of users.

As conventional techniques for executing individual recognition by employing face images, for instance, the following publication has been proposed:

"Face recognition system 'smartface' being robust with respect to change in face directional expressions" written by Yamaguchi and Fukui, Japanese Telecommunication Institute publication (D-II), volume J4-D-II, No. 6, pages 1045 to 1052 in 2001.

This conventional individual recognizing method is such a recognizing method that variations of face patterns are suppressed by employing moving pictures, and then, individual recognition is carried out. To perform high-precision recognition, it is important to collect various sorts of personal face patterns from the moving pictures. However, there is a problem that the acquisitions of these face patterns may depend upon motion of their faces of users.

In security systems utilizing face image recognition, there are high risks of unfair accesses by using face photographs. As a result, there is a need to carry out a correct discrimination whether entered face images correspond to actual faces, or face photographs. In such a security system constituted by only one video camera, when image qualities of photographs are deteriorated, it is difficult to distinguish actual faces from face photographs based upon only image information. In order to perform correct discrimination, utilization of one technical idea is conceivable. That is, the "shape-from-motion" technique capable of extracting three-dimensional information from motion of subjective articles may be utilized. However, feature points capable of correctly extracting therefrom three-dimensional information can be hardly detected from human faces which correspond to non-rigid objects having less texture. As a consequence, the security system arranged by only one video camera without using a specific appliance owns a problem. That is, this security system can hardly judge as to whether or not the subject corresponds to the photograph in the correct manner.

Since there is a limitation in the field angle of the single video camera as to the image captured by this single video camera, problems as to occlusions and reflections may occur. That is, feature points of faces are hidden because of directions of a face and reflections of spectacles. As a result, it is practically difficult to continuously detect all of these face feature points due to adverse influences caused by hiding of the face feature points and shadow. Also, since the face feature point located at the correct position is hidden, another problem occurs. That is, detection results may readily become unstable and inaccurate, for instance, this face feature point cannot be detected. Otherwise, even when this face feature point can be detected, such a point which is shifted from the originally correct point is erroneously detected.

When trying to understand human actions from images, it is very important information towards which direction a person faces. Therefore, there is a need to detect directions of faces robustly. Conventionally, the following methods are known: cutting out a specific face region from an image derived from a single camera, and matching the cut face region with templates of the face region photographed at various angles; extracting feature points and calculating a face direction based upon geometrical information; detecting a three-dimensional shape of a face and calculating a direction of the face. However, in these conventional methods, the following problems may occur: In the template matching method, since only one image is compared, the high-precision detection can be hardly realized. In the geometrical face-direction calculating method, the feature points of the face can be hardly extracted in the correct manner, and also, since the face is the non-rigid subject, the calculated face direction contains the error. In the method of utilizing the three-dimensional shape of the face, such a specific appliance as a range finder is required and in the stereo-image method requires the calculation cost, whereby restoring of the face shape itself can be hardly realized.

Also, in the conventional face recognition systems, for example, in JP-A-2002-183734, plural sets of cameras may be employed. However, in the case that a total number of cameras is merely increased, another problem may occur. That is, plural users are mixed with each other. For instance, assuming now that a total number of face which can be detected one time is equal to only 1, when a plurality of users are photographed by the multiple cameras, only one user can be detected by a certain camera, and only another user can be detected by another camera. At this time, in the case that the face features of the detected users are dealt with as those belonging to the same person, information of different people is mixed, thereby causing erroneous face recognition.

Moreover, if such a phenomenon occurs in which other persons are mixed with the own user when the own user is registered, not only the information about different users are registered, the following security problem may occur. That is, assume that the users are "A" and "B" and the user "B" corresponds to a person who is not allowed to be registered, the user "B" may provide a high similarity measure with respect to the registration data of the user "A". Therefore, the user "B" may pass through a gate while this user "B" poses as the user "A". Also, even when a plurality of faces can be detected one time, if the corresponding relationship among the cameras of these detectable faces cannot be established, then the others mixture problem may similarly occur.

As previously explained, there are various problems in the conventional face image techniques with employment of the face image. That is, the various sorts of face pattern images as to individuals must be collected, and the recognition precision is restricted due to variations in standing positions or face directions of persons. Also, when the personal identification is carried out by using a plurality of cameras, there is another problem that since plural users are mixed with each other, the personal identification is erroneously carried out.

SUMMARY OF THE INVENTION

The invention provide a face image processing apparatus including a face region detecting unit configured to detect a face feature point of a person from a plurality of images picked up by a plurality of imaging units respectively, to detect a face region; a face feature extracting unit configured to extract a face feature from an image of the face region detected by the face region detecting unit; a person recognizing unit configured to calculate a similarity measure based on a face feature of a specific person being previously registered and the face feature extracted by the face feature extracting unit to recognize the person; and an output apparatus which outputs a recognition result in the person recognizing unit.

The invention may provide a face image processing apparatus including: a face feature point detecting unit configured to detect a plurality of face feature points respectively from a plurality of images each picked up by one of a plurality of imaging units; a face feature point predicting unit configured to predict a position of one of the face feature points with regard to the other of the face feature points in accordance with a spatial corresponding relationship of the plurality of images; a face region cutting unit configured to cut out a plurality of face regions respectively from the plurality of images according to a plurality of face feature points corrected on the basis of results from the face feature point detecting unit and the face feature point predicting unit; a face feature extracting unit configured to extract a face feature from images of the plurality of face regions; a person recognizing unit configured to calculate a similarity measure on the basis of a face feature of a specific person being previously registered and the face feature extracted by the face feature extracting unit to recognize the person; and an output apparatus which outputs a recognition result in the person recognizing unit.

The invention may provide a face image processing apparatus including: a face region detecting unit configured to detect a feature point of a face from a plurality of images imaged by a plurality of imaging units to detect a face feature region; and a predicting unit configured to compare a feature of the detected face feature region with respective features of a face feature region of a person facing towards a plurality of predetermined directions to detect a face direction of the face.

The invention may provide a face image processing apparatus including: a face region detecting unit configured to detect a plurality of face feature points each obtained from one of a plurality of images imaged by a plurality of imaging units respectively; and a calculating unit configured to convert one of the plurality of face feature points to the other of the plurality of face feature points in accordance with a spatial corresponding relationship among the plurality of images to calculate a distance between the respective face feature points.

The invention may provide a certification apparatus, including: a plurality of imaging units which pick up a plurality of images respectively; a plurality of face region detecting units each configured to detect a face feature point from each of the plurality of images to detect a face region corresponding to the face feature point; a face feature extracting unit configured to extract a face feature from images each corresponding to the face region; and a person recognizing unit configured to calculate a similarity measure between a face feature of a specific person being previously registered and the extracted face feature to recognize the person.

The invention may provide a certification apparatus including: a plurality of imaging units which pickup a plurality of images respectively; a plurality of face feature point extracting units each configured to extract a face feature point from one of the plurality of images; an others mixture judging unit configured to judge whether an identical person is indicated by the face feature point extracted one of the plurality of face feature point extracting units and by the face feature point extracted the other of the plurality of face feature point extracting units; and a person recognizing unit configured to recognize a person according to the face feature point when the others mixture judging unit judges that an identical person is indicated.

The invention may provide a face image processing method, including: detecting a face feature point of a person from a plurality of images imaged by a plurality of imaging units to detect a face region; extracting a face feature from the image of the detected face region; calculating a similarity measure on the basis of a face feature of a specific person previously registered and the extracted face feature, to recognize the person; and outputting a recognition result.

The invention may provide a face image processing method including: detecting a face feature point from a plurality of images imaged by a plurality of imaging units to detect a face feature region; and comparing a feature of the detected face feature region with a feature of a face region of a person facing towards a predetermined direction to detect a face direction.

The invention may provide a face image processing method including: detecting a plurality of face feature points each obtained from one of a plurality of images imaged by a plurality of imaging units respectively; converting one of the plurality of face feature points to the other of the plurality of face feature points in accordance with a spatial corresponding relationship among the plurality of images; and calculating a distance between the converted face feature point and the other of the respective plurality of face feature points.

BRIEF DESCRIPTION OF THE DRAWINGS

The present invention may be more readily described with reference to the accompanying drawings.

DETAILED DESCRIPTION OF THE PREFERRED EMBODIMENTS

The present invention will now be described in detail with reference to drawings.

For example, a face image processing apparatus according to a first embodiment of the present invention will now be explained. In the first embodiment, while face feature regions are detected from images captured by multiple cameras, features owned by a face are calculated from the face feature regions so as to discriminate a person from other persons, and then, the discriminated result is outputted.

Figure 1:
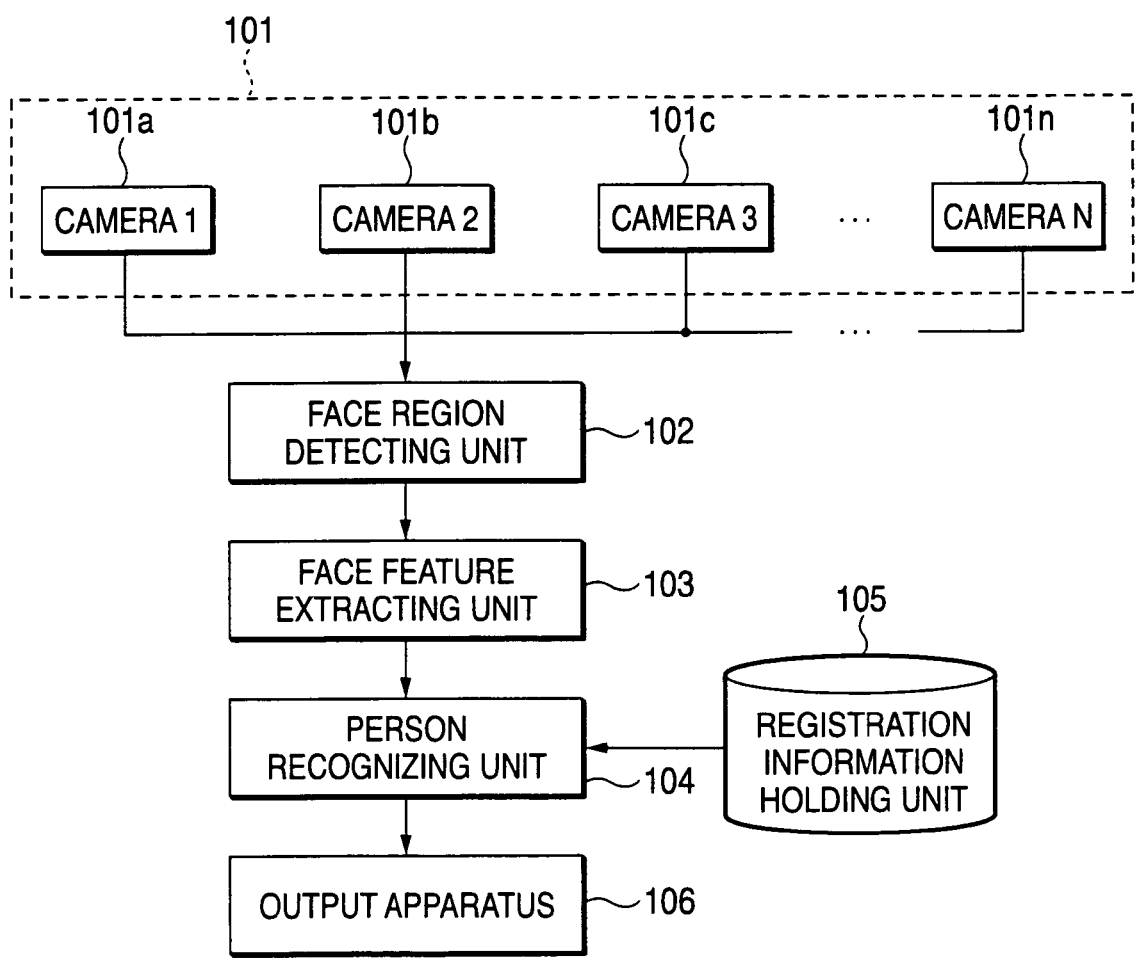
FIG. 1 is a structural diagram of a face image processing apparatus according to a first embodiment.

FIG. 1 is a diagram for indicating an arrangement of the face image processing apparatus of the first embodiment. An image input unit 101 is constituted by a plurality of video cameras 101a to 101n. If a total number of video cameras which image a person to be identified is larger than, or equal to 2, then any numbers of such video cameras may be employed. The below-mentioned explanation explains such a case that a total number of video cameras is 3 (see FIG. 2). A face region detecting unit 102 detects feature points (eyes, pupils, nostrils etc.) of a face of the person to be identified from a plurality of images which are captured by the respective video cameras 101a to 101n. The face region detecting unit 102 cuts out a region having a predetermined dimension and a predetermined shape based upon dimensions and a relative positional relationship among the feature points of the detected face, and then, corrects an inclination and the dimension of this region so as to form a face feature region having a size of "m×n" pixels ("m" and "n" pixels are natural numbers).

In a face feature extracting unit 103, a face feature vector is calculated from the image of the formed face feature region. The face feature vector may be realized by, for example, an "m×n"-dimensional vector in which the respective elements are employed as pixel values. In addition, such a process operation as a histogram averaging process, a differential process, and a Fourier transform may be carried out as to the face feature vector. A plurality of face feature vectors are calculated from a plurality of images sequentially captured by the image input unit 101 configured by the plurality of video cameras and the face region detecting unit 102., (K-L) expansion is carried out with respect to these face feature vectors, and then, the resulting orthonormal vector is defined as a face feature of this person to be identified. When the person to be identified is registered, this feature is stored in a registration information holding unit 105 as discrimination data of this person to be identified.

A person recognizing unit 104 calculates similarity measures by comparing an entered face feature of an unknown person with the face features of the persons for an identification purpose, which have been previously held in the registration information holding unit 105 so as to identify the person. An output apparatus 106 provides a recognition result in a picture, voice, or both the picture and the voice to a user.

Figure 2:
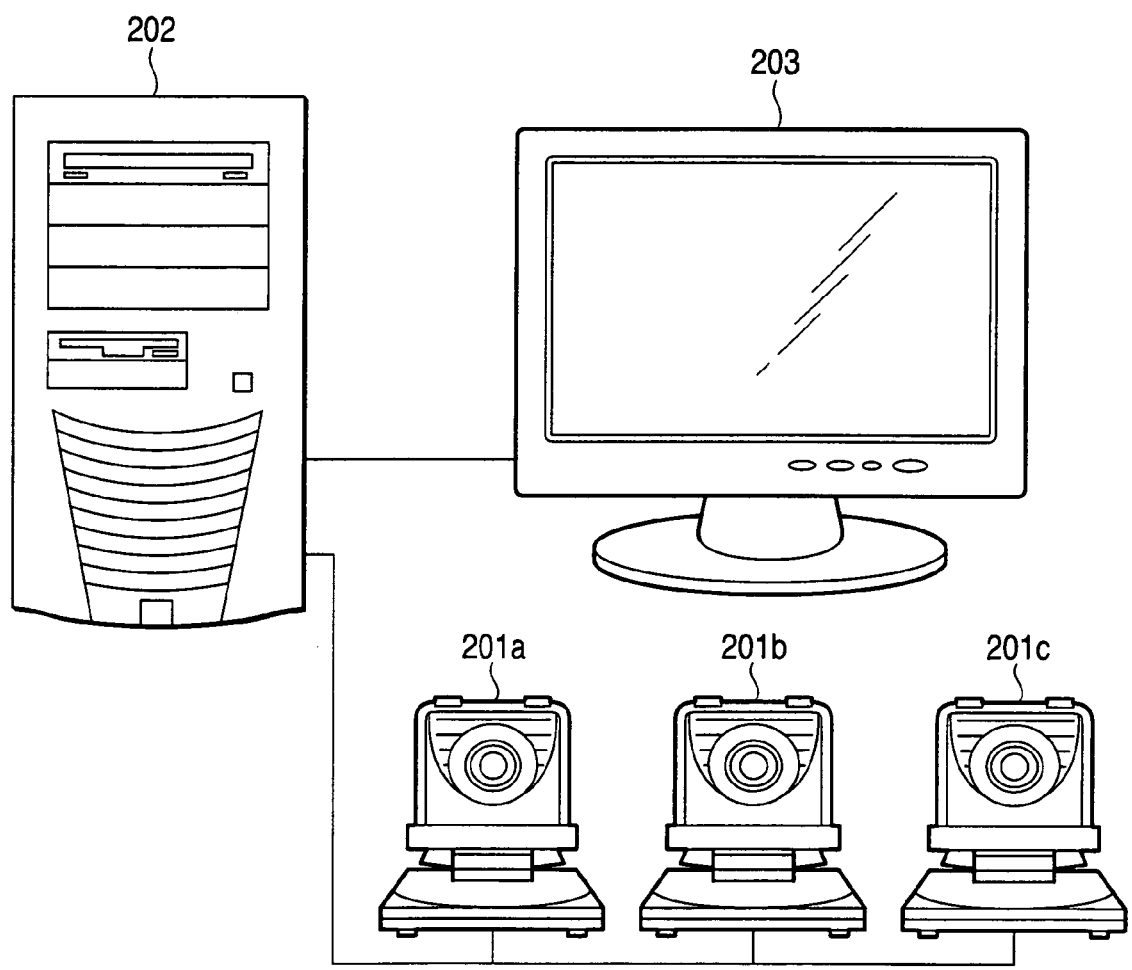
FIG. 2 is a diagram showing an outline of the face image processing apparatus of the first embodiment.

A system structural example of this embodiment is shown in FIG. 2. Image input means 201a to 201c employed in this embodiment are arranged by three sets, or more sets of image input means, for instance, a moving picture imaging apparatus such as a video camera, a still image imaging apparatus such as a still camera, and the like. These plural cameras are specially arranged in such a manner that imaging areas thereof are overlapped with each other in order to acquire images of a person to be identified at the same time. The face region detecting unit 102, the face feature extracting unit 103, and the person recognizing unit 104 are arranged by a calculation processing means 202 of FIG. 2, for example, by such a program (software) operated on a personal computer. The registration information holding unit 105 of FIG. 1 is arranged by a magnetic storage apparatus (hard disk), an optical storage apparatus (CD-ROM, DVD-ROM, CD-R, CD-RW, either write-once type or rewritable type CD/DVD recording medium), and the like, which are equipped with the calculation processing means 202 of FIG. 2. The output apparatus 106 of FIG. 1 is arranged by a display means 203 (containing speaker, not shown) of FIG. 2. This output apparatus 106 outputs a result of face identification by way of pictures, voice and the like.

Next, the respective structural units of this embodiment will be explained in detail.

In the image input unit 101, a moving picture containing a face of a person to be identified is inputted from either a video camera or a specific input apparatus. For example, in addition to a general-purpose USB camera and a digital video camera, both a camera operable in panning/tilting/zooming modes and an input apparatus of three-dimensional information such as a range finder may be realized. Also, since an infrared camera is employed, an image which can be hardly influenced by an illumination condition is photographed, so that recognition precision may be improved. The respective video cameras 101a to 101n may be made of video camera appliances having the same arrangements, or may be made of video camera appliances having difference arrangements. Alternatively, the respective video cameras may establish synchronizations as to input timing of images by utilizing synchronization signals among these video cameras. As to connecting systems among the respective video cameras and between each video camera and processing means (for example, personal computer) connected subsequent to each video camera, a plurality of connecting systems such as USB system, IEEE1394 system, and network route system may be mixed with each other. These video cameras may be fixed on an appliance such as a frame, may be freely moved, and/or the respective video cameras may be specially transported in a dynamic manner by employing a specific base, for example, an arm and a rotation base.

The images acquired from the image input unit 101 are sequentially sent to the face region detecting unit 102. In the face region detecting unit 102, face feature points and a face feature region of a person to be identified are acquired from the respective images captured by the image input unit 101. Specifically, the face feature points are robustly extracted by combining positional geometrical restrictions of eyes (pupils), nostrils etc., shape information as to the face feature points, and collations of patterns as to the face feature points. The shape information e is extracted using a circular-shaped separability degree filter and/or an ellipse-shaped separability filter. Once the face feature point is obtained, both an inclination and a dimension of the face are corrected based upon a positional relationship between these face feature points. Then, a face feature region having a predetermined dimension is cut out from the acquired image.

In the face feature extracting unit 103, a face feature is extracted from the image of the acquired face feature region. First, the image of such a face feature region constructed of (m×n) pixels is converted into an (m×n)-dimensional face feature vector in which pixel values of the respective pixels are employed as elements. In addition, a similar process operations are carried out with respect to a plurality of images which are acquired via the face region detecting unit 102 from the image input unit 101, so that a plurality of face feature vectors are acquired in a time sequential manner. At this time, image inputs from the respective video cameras 101a to 101n employed in the image input unit 101 may be arbitrarily selected. For instance, the same quantities of images acquired from all of these video cameras 101a to 101n may be inputted. Alternatively, a total quantity of images derived from a specific video camera may be relatively increased, or decreased with respect to those of other video cameras. A plurality of face feature vectors which have been acquired in the above-explained manner are calculated by using (K-L) expansion so as to obtain an orthonormal vector. The face feature relating to the person can be identified as a subspace where those orthonormal vectors are set as base vectors.

In the registration information holding unit 105, the acquired face feature (namely, subspace indicative of this face feature) is stored in a recording medium such as a hard disk and/or a memory. The storage medium is connected to a personal computer for controlling the cameras and executing a person identifying process operation or to another personal computer via a network. The recording medium may be removable or replaceable one so that data backup can be carried out.

The person recognizing unit 104 compares the face feature registered in the registration information holding unit 104 with the acquired face feature of the person to be identified. By this, the person recognizing unit 104 performs an identification of the person as to whether the person is identical with the registered person (That is, whether the person is judged to be identical with the registered person or not.). As the method for comparing the face features with each other, for instance, there is a "Mutual Subspace Method". As the recognition method, another pattern recognition method may be employed. Here, the "Mutual Subspace Method" is as follows: When there are two subspaces to be checked, angles (hereinafter referred to as "canonical angles" ("N" pieces of canonical angles are present in a N-dimensional subspace.)) defined between the two subspaces are calculated. The minimum canonical angle among the calculated canonical angles is used as a similarity measure. Different from the conventional still-image based method, the Mutual Subspace Method employs subspaces as dictionaries and inputs. Accordingly, the mutual subspace method can stabilize the accuracy of recognition while not being influenced by one erroneous (improper) pattern and a fluctuation in the patterns. The similarity measure between these face features can be calculated by executing such a recognizing method. This calculated similarity measure is judged based upon a predetermined threshold value so as to identify the person with the registered person. The threshold value may be determined in a recognition experiment in advance. The threshold value may be variable according to features of the person.

In response to the result obtained in the person recognizing unit 104, the output apparatus 106 provides the user with the recognition result as a picture including an image and/or characters or as a combination of the picture and sound. The output apparatus 106 may assist understandings of users by freely combining a speaker with such an output apparatus as a liquid crystal projector and a display screen in addition to either a CRT or a liquid crystal panel which is normally used as a display device of a personal computer.

Next, a description is made of a face image processing apparatus according to a second embodiment of the present invention. In this second embodiment, an explanation will be made with regard to a face image processing apparatus in which a plurality of cameras are arranged to capture a plurality of images of a user such that information characteristics of the respective images can be mutually compared in order to judge whether the user is an actual human, thereby preventing one from obtaining an unfair identification result even when the one uses a face photograph of a registered another person.

Figure 3:
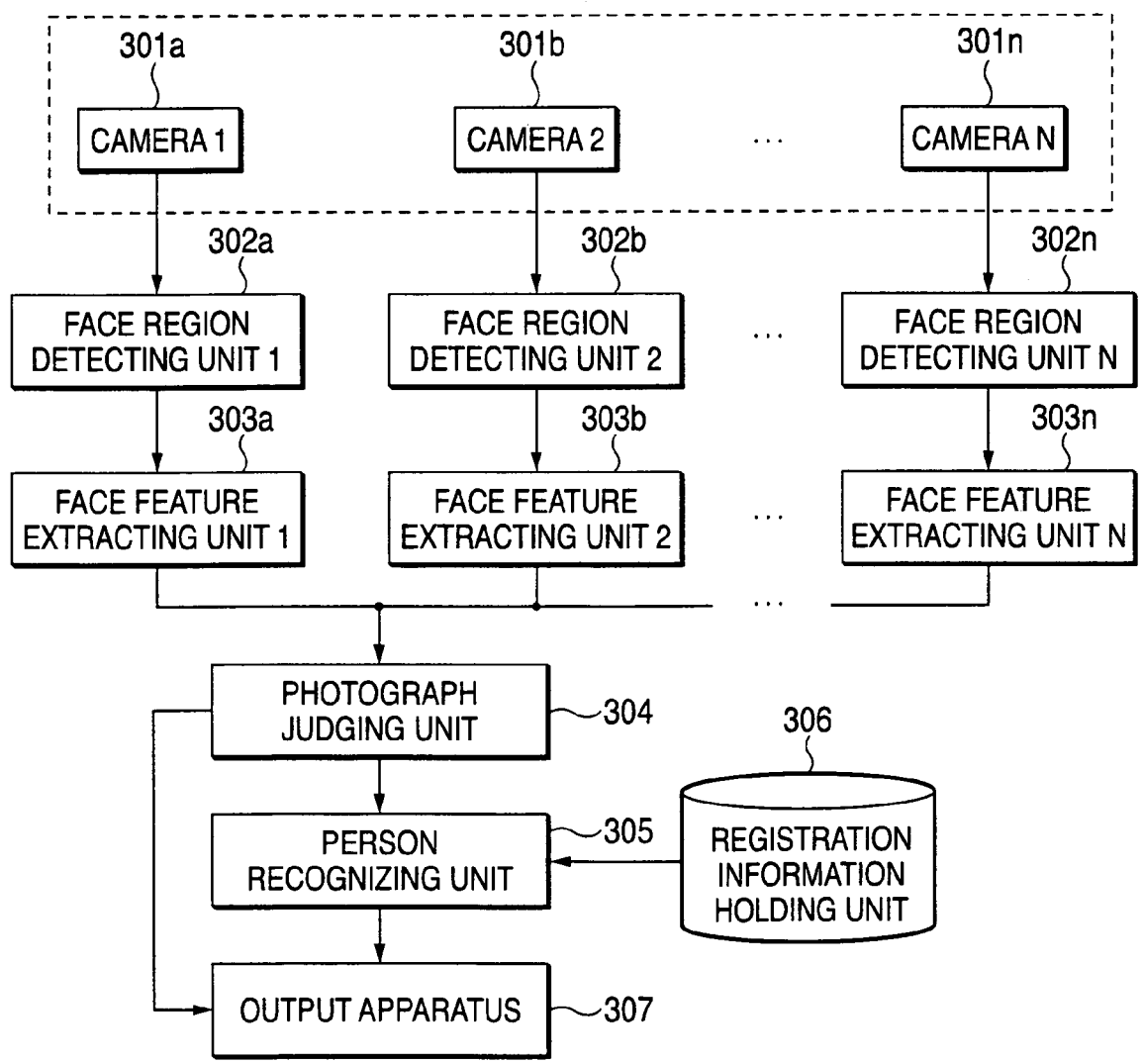
FIG. 3 is a structural diagram of a face image processing apparatus according to a second embodiment.

FIG. 3 indicates an arrangement of the face image processing apparatus according to this second embodiment. An image input unit 301 corresponds to plural sets ("N" sets) of video cameras 301a to 301n. Face images captured by the respective video cameras 301a to 301n are processed by face region detecting unit 302a to 302n so as to detect face feature points of a person to be identified, so that face feature points are extracted. Thereafter, the feature detecting units 303a to 303n each corresponding to one of the video cameras 301a to 301n extract features of the face (for instance, (m×n)-dimensional face feature amount vectors) of the person to be identified based upon images of the face feature regions extracted by the face region detecting units 302a to 302n.

Next, a photograph judging unit 304 will now be explained in detail. The photograph judging unit 304 calculates a similarity measure of images obtained between a set of two video cameras based upon the face feature amount vectors which are calculated with respect to the images acquired from the respective video cameras 301a to 301n. For instance, the photograph judging unit 304 calculates a similarity measure between a face feature 1 of an image acquired from a camera 1 and a face feature 2 of an image acquired from a camera 2 so as to compare the output image of the camera 1 with the output image of the camera 2.

Figure 8:
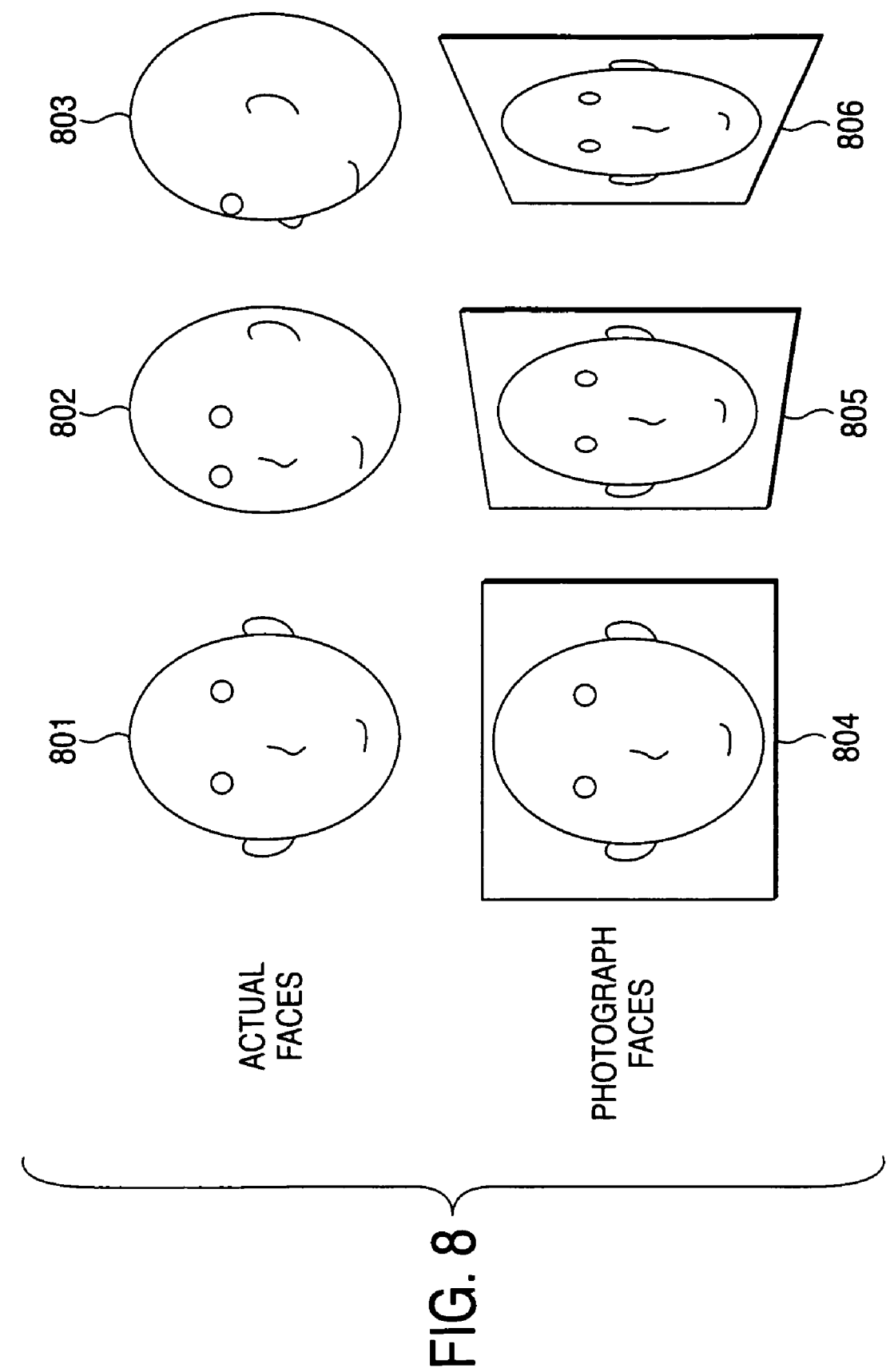
FIG. 8 is an explanatory diagram for explaining a view difference between an actual face and a face photograph.
Figure 9:
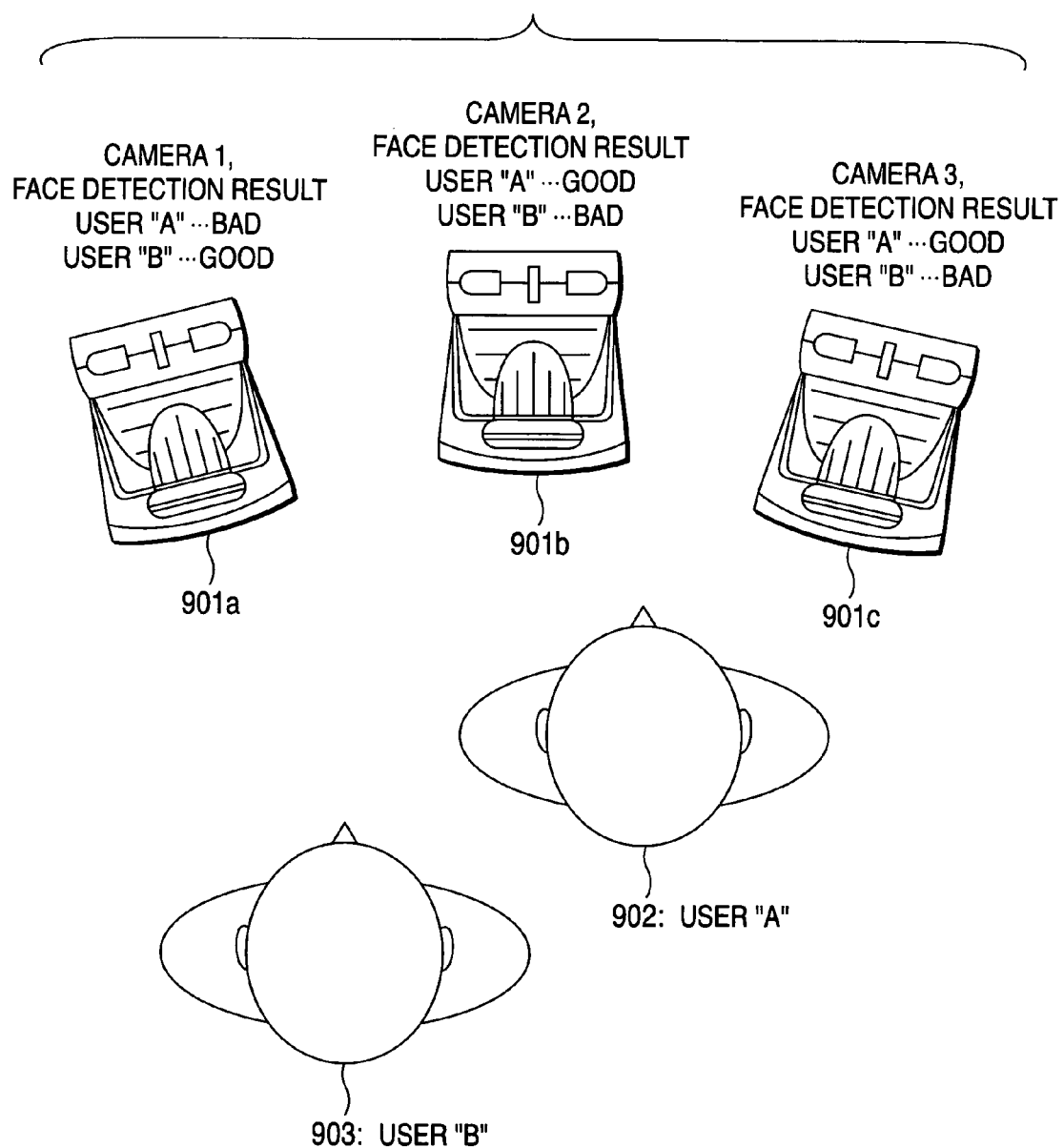
FIG. 9 is an explanatory diagram for explaining an example in which other persons are mixed in a face image.

It is now predicted that, for example, the camera 1 and the camera 2 are arranged in such a manner that these cameras 1 and 2 are specially located along a horizontal direction (right/left direction). FIG. 8 represents patterns (801 to 803) of images obtained by photographing a person to be identified, and also, patterns (804 to 806) of photographic images which have been obtained by photographing the person to be photographed, while a photographic angle is varied. As indicated in FIG. 8, as to the face images (801 to 803) obtained by actually photographing the face of the person to be identified, since the photographic subject is a three-dimensional object, even when inclinations and sizes of the faces are corrected with respect to the images acquired from the plural cameras, the resulting face patterns obtained from the camera 1 are not made equal to those of the camera 2. However, in such a case that a photographic image is photographed by using a plurality of cameras (namely, photographic image patterns 804 to 806), since the face images appeared on these photographic images are two dimensions, if inclinations and sizes of images photographed by a plurality of cameras are corrected by way of the affine transformation and the like, resulting face patterns of the camera 1 are made equal to those of the camera 2. As a consequence, the photograph judging unit 30 can discriminate as to whether the photographic subject corresponds to a three-dimensional subject (face of person), or a two-dimensional subject (face photograph).

The photograph judging unit 304 judges as to whether the photographic subject corresponds to the three-dimensional subject (face of person), or the two-dimensional subject (face photograph). In the case that the photographic subject corresponds to the face of the person (namely, when input image is not equal to photographic image), a person recognizing unit 305 performs a recognizing operation of a person by comparing face feature vectors for personal recognizing purposes which have been registered in a registration information holding unit 306 with the feature amount vector of the face of the person to be identified, and then, outputs an identification result to an output apparatus 307. More specifically, in this second embodiment, since the face features have been calculated with respect to these video cameras 301a to 301n in the face feature extracting units 303a to 303n, an entire face feature must be calculated. While the face feature regions are gathered with each other which have been acquired from the respective video cameras 301a to 301n before being (K-L)-expanded in the face feature extracting units 303a to 303n, since the (K-L) expansion is again calculated, a single face feature is calculated, so that a similarity measure between the single face feature and the face features of the registration information holding unit 306 can be calculated. In the case that the photograph judging unit 304 judges that the entered image corresponds to the photographic image, the output apparatus notifies "not recognizable subject" to the user without any identifying process operation by the person recognizing unit 305.

As previously explained, the similarity measure among the images acquired from the plural cameras is calculated. When the similarity measure is larger than, or equal to a certain threshold value (namely, similarity measure is high), these entered images can be judged as a photographic image. Assume that the distances among the plural cameras are extremely close to each other, even the similarity measures between images of a three-dimensional subject would be high. At this time, it is difficult to discriminate whether a photographic subject is a three-dimensional subject, or a two-dimensional subject. Therefore, it is preferable to secure a certain distance between the cameras to effectively eliminate the use of photographic images.

Also, in such a case that there are plural camera combinations made of plural sets of cameras, for example, similarity measures every combination made of plural cameras are summarized with each other, namely, all of these similarity measures are considered, so that discrimination is made as to whether a photographic subject corresponds to a three-dimensional subject, or a two-dimensional subject. In this case, discrimination precision may be improved. Alternatively, in view of a security aspect, such a rejection made by a photograph may not be notified to the user. That is, while such an indication is made which is equivalent to the normal not-recognizable subject (namely such message, or speech output that "person identification fails"), information related to the judging basis for the photograph judgement by the system is not intended to be provided with respect to the unfair user. Alternatively, in this second embodiment, while the registration information holding unit 306 holds therein the face features derived from the respective cameras during registering operations in a separate manner, similarity measures between these held face features and the face features supplied from the respective cameras may be compared with each other.

A description will now be made of a face image processing apparatus according to a third embodiment of the present invention. In this third embodiment, such an apparatus for performing a face recognizing operation in high precision is explained. That is, in such a case that while a plurality of image input units (multiple cameras) are utilized, a feature point of a face can be detected from one camera but the feature point of the face cannot be detected by another camera due to hiding of the feature point and/or a distortion, a face feature point appearing on an image which could be acquired from the camera not capable of detecting the feature point is predicted based upon such an information derived from the first-mentioned camera capable of detecting the feature point, and then, a face feature is detected with respect to a direction of the face and hiding of the feature point in a robust manner, so that the high-precision face recognizing operation is carried out.

Figure 4:
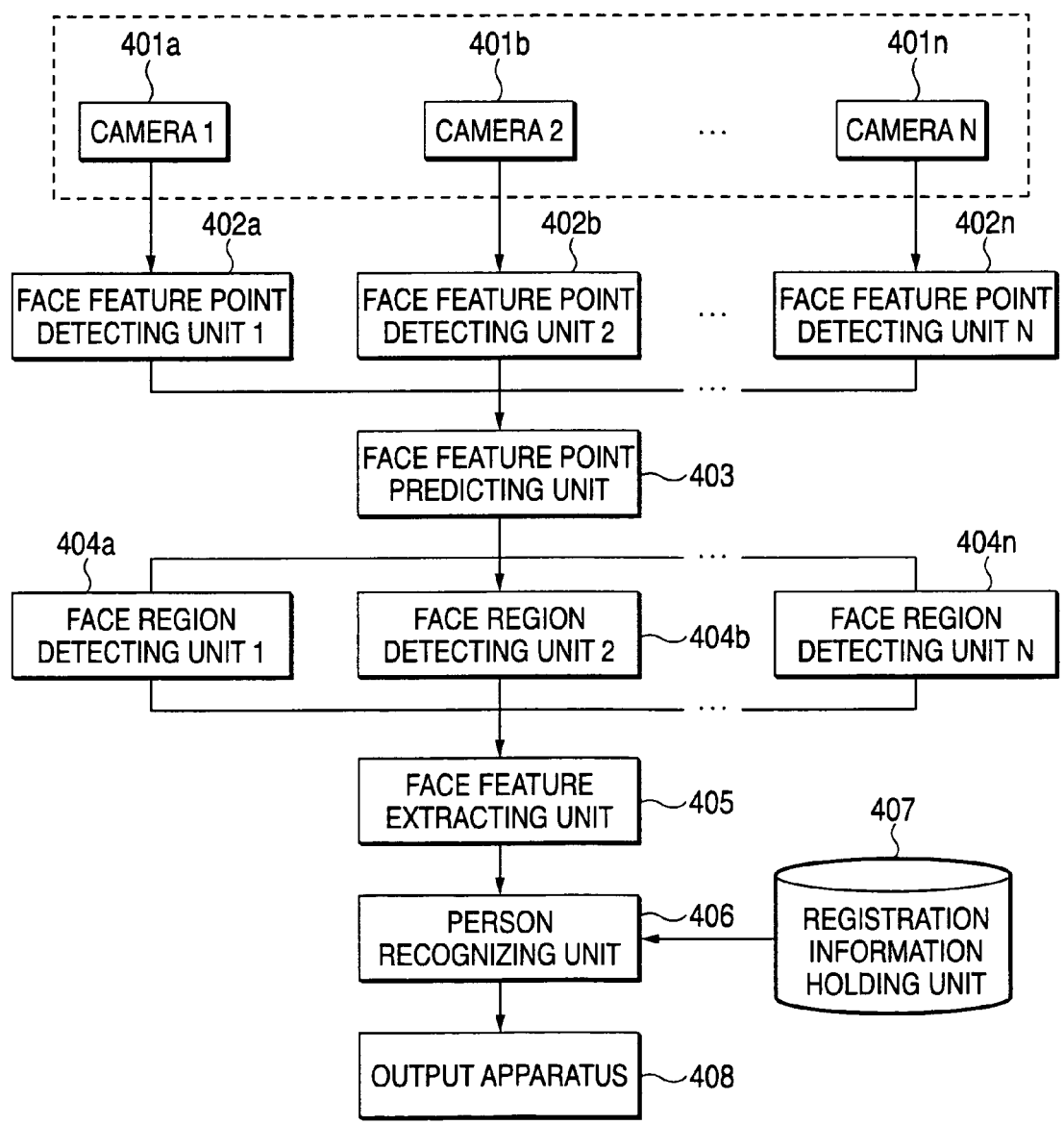
FIG. 4 is a structural diagram of a face image processing apparatus according to a third embodiment.

FIG. 4 shows an arrangement of the face image processing apparatus according to this third embodiment. Image input units 401a to 401n are arranged by a plurality (two, or more) of image input means, for example, video cameras. It should be noted that no specific limitation is made as to the arrangement of these plural cameras and a total number of these cameras.

In face feature point extracting units 402a to 402n, upon receipt of a plurality of images acquired from a plurality of cameras 401a to 401n, feature points of faces of a person to be identified in the respective images are extracted. It should be understood that a structure of the feature points of the faces to be extracted and the extracting method thereof are the same as those of the face region detection units in the first embodiment. The feature points of the faces corresponding to the images may be acquired from the input images of the respective cameras by these face feature point extracting units 402a to 402n. On the other hand, such a case may be conceived, depending upon a direction of the face of the person to be identified, a standing position of this person, the arrangement and directions of the respective cameras, either a portion or all of feature points contained in such an image photographed by a specific camera cannot be extracted. In such a specific case, a dropped feature point (dropped feature points) may be complemented by way of a calculation based upon other feature points which have been correctly extracted by the face feature point predicting unit 403. Next, this face feature point predicting unit 403 will be explained in detail.

A face feature point predicting unit 403 predicts a face feature point which could not be detected. To predict this face feature point, a positional relationship among the plural cameras must be previously determined. Concretely speaking, such an initial condition is required under which calibration of the respective cameras should be carried out. This calibration covers relative positioning of the cameras, and setting of image conversion parameters. The calibration of the cameras requires combinations (corresponding relationships) of points on an image in such a manner that corresponding relationships of photographing regions among a plurality of cameras are known.

This corresponding point may be extracted as follows. That is, for example, when the cameras are previously installed, a specific calibration board having such as a grid shape all dimensions of which are known is prepared, and then, points on this calibration board are manually pointed out by a person, or automatically pointed out. Alternatively, when initial data of a person are registered, considering now such a case that all of feature points were acquired in respective camera inputs at a certain time instant, since the correspondence among these feature points have been established among the cameras, the cameras may be calibrated by employing these feature points. If several corresponding points among the images can be obtained, then the camera calibration may be realized in accordance with such a method. That is, such an object whose geometric characteristic and optical characteristic are known (board having grid patterns etc.) is photographed, correspondence relationships are solved from the photographed feature points so as to acquire a camera parameter.

When the camera can be calibrated, since the corresponding points have been acquired among a plurality of images based upon the previously-calibrated camera parameters, positions on the three-dimensional space can be calculated by employing such a transformation process operation as epipolar geometry. As a result, a coordinate point of an arbitrary pixel on the three-dimensional space can be calculated, whose correspondence relationship has been established among the plural cameras. If the coordinate position on the three-dimensional space can be calculated, then this coordinate position can be converted into a coordinate point which is viewed from an arbitrary viewpoint. In other words, in such a case that a face feature point which could be detected by a certain camera is present in a view field of another camera, this face feature point can be converted into a face feature point in the last-mentioned camera.

Figure 7:
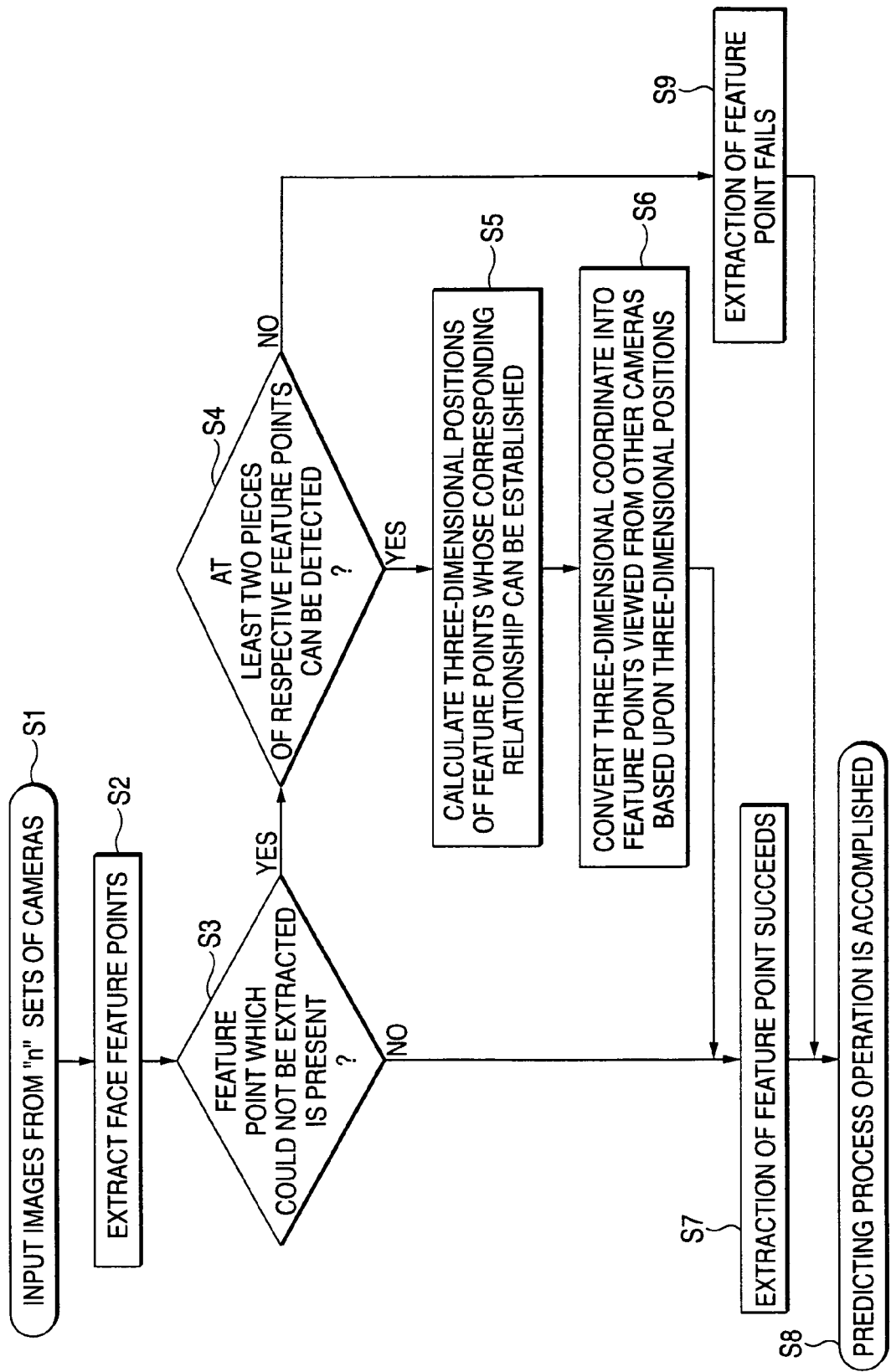
FIG. 7 is a flow chart explaining a face feature predicting process operation.

FIG. 7 shows a flow chart for describing the above-described feature point predicting process operation. In this flow chart, first, images of a person to be identified are inputted from plural sets ("n" sets) of video cameras (step S1), and then, face feature points are extracted from these input images (step S2). At this stage, when all of the face feature points as to all of these video cameras have been extracted, the extractions of the face feature points can succeed, and thus, the predicting process operation is accomplished (steps S7 and S8). On the other hand, in the case that such face feature points are present which could not be extracted as to an image captured by a certain camera (step S3), a check is made as to whether or not each of the respective feature points could be detected by two, or more sets of the video cameras (step S4). When there is such a face feature point which could not be detected by two, or more sets of the video cameras, a correspondence relationship between the feature points cannot be established, and three-dimensional positions cannot be obtained. As a result, the extractions of the feature points fail, and thus, the predicting process operation is ended (step S9). In such a case that two, or more feature points as to each of the images could be extracted, namely, the corresponding relationship among these plural feature points can be established (step S5), the respective feature points are converted into a coordinate system on the three-dimensional space. This three-dimensional coordinate system is converted into a coordinate system of a viewpoint which contains a feature point which cannot be extracted and is viewed from the camera so as to predict the feature point (step S6). Since all of the feature points which could not be extracted are predicted, the extractions of the feature points can succeed, and then, this predicting process operation is accomplished (steps S7 and S8).

Also, different from the above-explained arrangement, even when face feature points as to the respective images can be extracted, as to the extracted feature points, the face feature points are mutually predicted among the images photographed by the respective cameras, and also, a check is made of a difference between a detected coordinate and a coordinate predicted by a calculation. As a result, feature point extracting precision is verified, so that a judgement of an error detection and detection precision may be improved.

The face feature points which have been corrected based upon the face feature points predicted by the face feature point predicting unit 403 are subsequently transferred to face region cutting units 404a to 404n. In the face region cutting units 404a to 404n, a face region having a constant size and a predetermined shape is cut out based upon the corrected face feature points, and then, both an inclination and a dimension of this cut face region are corrected so as to produce an image of a face feature region having a dimension of (m×n) pixels.

Once the image of the face feature region is formed, as previously explained in the first embodiment, a face feature extracting unit 405 produces an (m×n)-dimensional face feature vector, and then, calculates a face feature of the person to be identified by using (K-L) expansion. A person recognizing unit 406 compares this face feature with such face features which have already been registered in a registration information holding unit 407 in order to identify a person based upon the personal face image information.

A face image processing apparatus according to a fourth embodiment of the present invention will now be described. In this fourth embodiment, such a detecting method is explained. That is, while multiple cameras are employed, this method detects in a stable and correct manner that a face of a subject person is directed to which direction.

Figure 5:
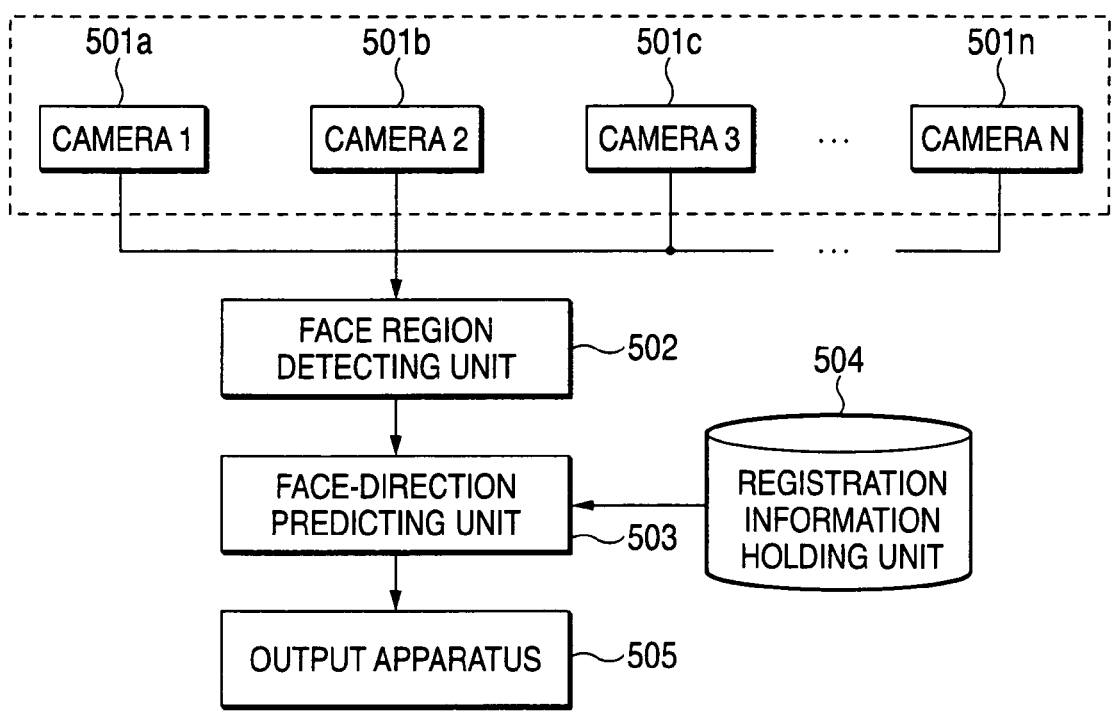
FIG. 5 is a structural diagram of a face image processing apparatus according to a fourth embodiment.

As represented in a structural diagram of FIG. 5, this face image processing apparatus is arranged by an image input unit 501, a face region detecting unit 502, a face-direction predicting unit 503, a registration information holding unit 504, and an output apparatus 505. The image input unit 501 is constituted by a plurality of cameras 501a to 501n. The face region detecting unit 502 detects face regions from entered images. The face-direction predicting unit 503 calculates a direction of a face from the face regions. The registration information holding unit 504 previously registers thereinto images as to various directions of faces. The output apparatus 505 provides a detection result. Next, the respective structural elements will be explained in detail.

While the image input unit 501 is arranged by a plurality of video cameras, two sets, or more sets of video cameras are arranged in such a manner that face images of a person to be identified may be imaged at the same time. It should be noted that a total number of these video cameras is not specifically limited to the above number in this fourth embodiment.

In the face region detecting unit 502, face feature points of the person to be identified are detected from input images of the respective video cameras; face regions are cut out from the images based upon the detected face feature points; and then, the dimensions of the cut face regions are normalized so as to cut out such a face feature region having a predetermined dimension. This detecting method may be realized by employing the same detecting method as explained in the first embodiment.

Figure 6:
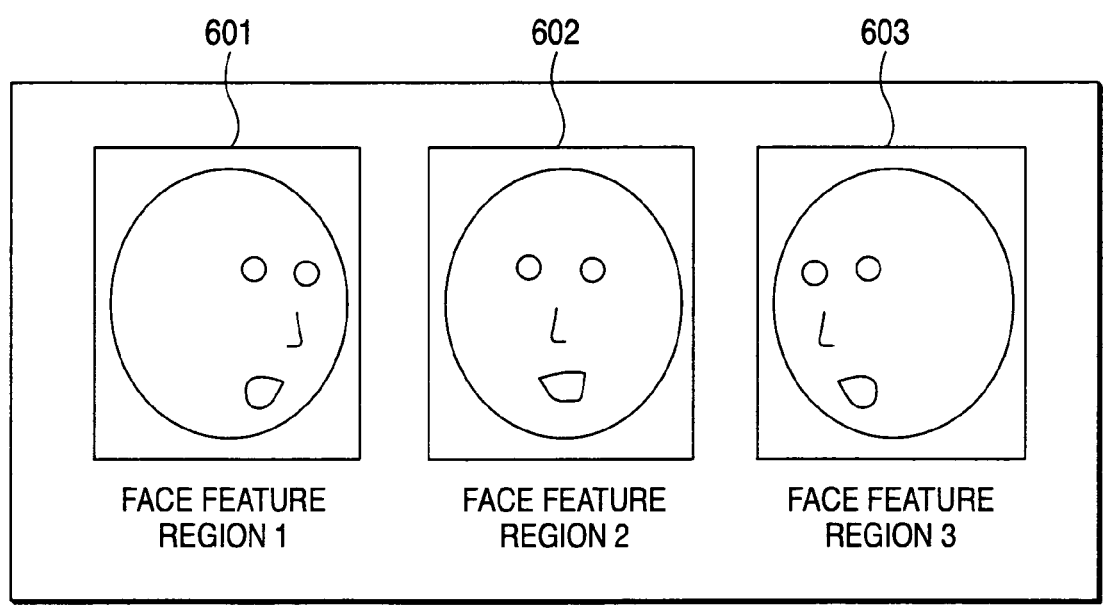
FIG. 6 shows an example of a face feature region set.

The face-direction predicting unit 503 predicts that the person to be checked is directed to which direction by utilizing the cut face feature region. This face-direction predicting unit 503 defines a combination set of images (cut face feature regions) which have been imaged by the multiple cameras at a certain time instant as one face-direction feature set. Then, the face-direction predicting unit 503 predicts a face direction of the person to be identified based upon this face-direction feature region set. FIG. 6 indicates an example as to a face-direction feature region set of three face images (601, 602, 603) of a specific person to be identified, which have been photographed at a certain time instant in the case that three cameras are arranged at different positions. The face-direction predicting operation by the face-direction predicting unit 503 is carried out by comparing the face-direction feature region set obtained from the input images with a face-direction feature region set which has already been registered every certain angle in the registration information holding unit 504. There are many methods as to how to handle to face-direction feature region set, and how to compare these face-direction feature region sets with each other. For example, the below-mentioned method may be executed.

First, in the case that a system is constituted by "N" pieces of cameras, a face-direction feature region set is constituted based upon "N" pieces of face feature regions. At this time, assuming that the face-direction feature set is defined as such a region having (m×n) pixels, in which face feature regions are arranged along a lateral direction. Since this face-direction feature set is regarded as an (N×m×n)-dimensional feature vector in which pixel values are used as elements, the face-direction region set is converted into a single face-direction feature. Then, while plural pieces of the known face-direction features with respect to the known angles are collected, these known face-direction features are calculated by using (K-L) expansion, and then, the known face-direction features are registered as face-direction feature subspaces into the registration information holding unit 504 as subspaces corresponding to the respective angles. All of the face-direction feature subspaces are calculated as to the face-direction feature region sets for the plural angles which have been sampled at a preselected unit angle (5 degrees, 10 degrees etc.). When a face direction is actually predicted, a face-direction feature is calculated as to entered face images which were photographed at a certain time instant, and this calculated face-direction feature is compared with the face-direction feature subspace which has been registered in the registration information holding unit 504, so that the face direction is predicted by employing, for example, the subspace method. This subspace method corresponds to such a method for performing a recognizing operation by employing only a small number of eigenvectors. This subspace method can effectively identify patterns in a small dimension.

As the method for converting this face-direction feature region set into the face-direction feature, not only the acquired face image data may be merely arranged along the lateral direction, but also other process operations and other converting operations may be carried out, in which the acquired face image data may be combined with other data, and the face image data may be processed by a differential filter as a pre-process operation. Alternatively, as the method for calculating the similarity measure between the input face image feature and the registered face image feature of the registration information holding unit 504, another method may be employed which is different from the subspace method. As to the comparisons between the input face-direction feature and the face-direction features which have been registered in the registration information holding unit 504 every angle, all of combined face-direction features need not be investigated. For example, in the case that a low similarity measure can be detected at a certain angle, no calculation is carried out at angles located in the vicinity of this certain angle, so that the process operation may be carried out in a high speed.

Finally, the judgment result of the face direction is sent to an output apparatus 505 so as to be provided to the user (resulting message is displayed on display means, or produced by voice). Alternatively, this judgement result may be set so as to execute another process operation, or may be written into a recording apparatus and the like.

Next, a face image processing apparatus according to a fifth embodiment of the present invention will now be explained. In this fifth embodiment, such an apparatus is described. That is, when feature points are extracted as to images acquired from a plurality of image input apparatus (multiple cameras), this apparatus predicts an standing position (relative position with respect to multiple cameras) of a person to be identified based upon positions of these extracted featured points, and judges as to whether or not this standing position is located at the same place.

Figure 10:
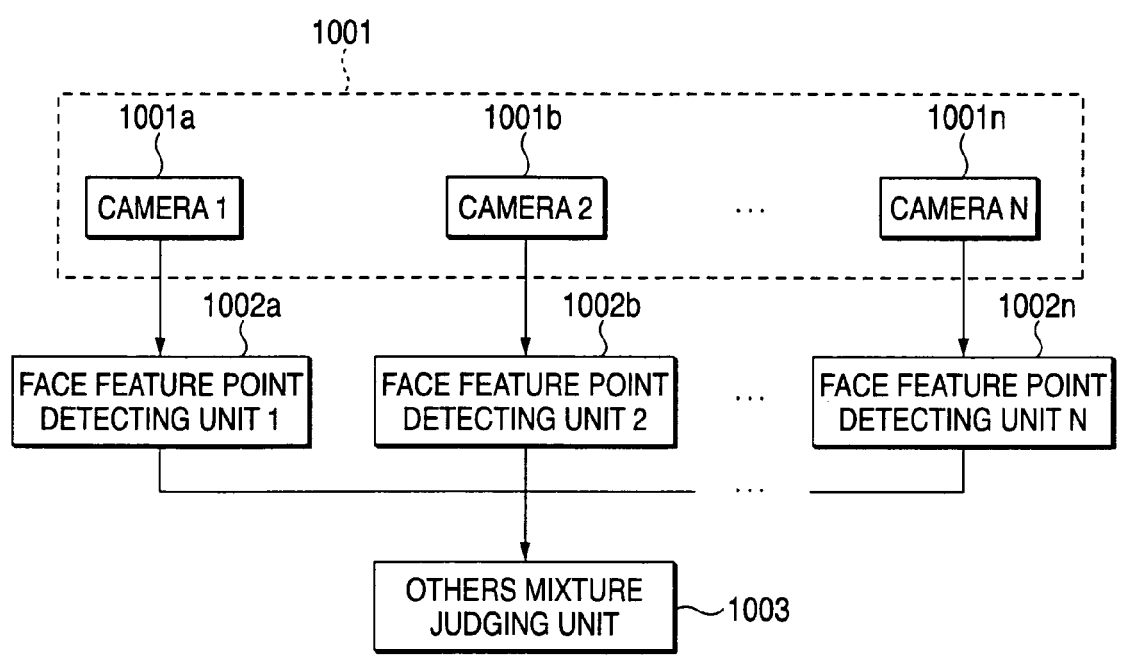
FIG. 10 is a structural diagram of a face image processing apparatus according to a fifth embodiment.

FIG. 10 shows an arrangement of the face image processing apparatus according to this fifth embodiment. An image input unit 1001 is constituted by a plurality of imaging apparatus 1001a to 1001n, namely, two sets, or more sets of general-purpose video cameras, still cameras, or other sorts of cameras. However, the fifth embodiment does not limit sorts and quantities of imaging apparatus. It is so assumed that converting parameters of images acquired from the respective cameras have been calibrated, and also, a positional relationship between camera parameters and these cameras is already known.

Receiving images captured by the image input units 1001a to 1001n, face feature point extracting units 1002a to 1002n extract feature points of faces as to the respective images. As to both the feature points of the faces to be extracted and an extracting method thereof in this case, a similar method to the face region detecting unit in the first embodiment may be employed.

An others mixture judging unit 1003 judges as to whether or not the feature points acquired from the respective cameras indicate the same person based upon the face feature points which have been detected as to the respective images. This others mixture judging unit 1003 will now be explained in detail.

A description is made of a method capable of judging as to whether or not a person "A" corresponding to a face image acquired by a certain camera is identical to another person "B" corresponding to a face image acquired by another camera at the same time. As previously explained in the third embodiment, if the multiple cameras which constitutes the image input unit 1001 has been calibrated, then arbitrary points on image planes corresponding thereto among the respective cameras 1001a to 1001n can be mutually converted into points on the three-dimensional space in the coordinate system. As a consequence, all of feature points acquired as to the images which have been acquired from the respective cameras are converted into coordinate points on the three-dimensional space. In this converted coordinate system, a distance "L" between the same sorts of feature points (for example, right eye and right eye) is calculated. A scale of a distance may employ, for example, a generally-known Euclidean distance. When this distance "L" is longer than, or equal to a predetermined threshold value, there are some possibilities that these feature points are not identical to each other. As to the feature points which correspond to each other on the converted coordinate system, distances "L" among the corresponding feature points are calculated. Then, a single scale "L*" is calculated in such a manner that the distances "L" are summed to each other and are averaged with respect to each of the feature points every camera. If this single scale "L*" is larger than, or equal to a predetermined threshold value, then it is possible to judge that the person "A" corresponding to the face image acquired by one camera is not identical to the person "B" corresponding to the face image acquired by another camera. When such a judgement result is obtained, it is so judged that other persons are mixed with the own person. On the other hand, when the distance "L" is smaller than the predetermined threshold value, it is so judged that the persons corresponding to these face images are identical to each other, and no other persons are mixed with the own person.

In such a case that the face images corresponding to the plural persons are detected from the respective cameras, the above-explained scale "L*" is calculated every face of the respective cameras, and also, the corresponding relationships between these scales "L*" and the respective faces are established. As a result, grouping of the face images as to the plural persons may be realized.

(Modifications)

In the third embodiment, when the respective feature points are detected with respect to the images acquired from the plural cameras, a similarity measure (certainness) of this feature point may be alternatively calculated. For instance, certainness "Ep" of a feature point after being predicted may be calculated as a product of similarity measures of two feature points whose relationship has been established. In this case, even when the corresponding relationship between the feature points can be established (predicted) based on the certainness, in such a case that the value of this certainness "Ep" is small, final face detecting precision may be improved by neglecting this corresponding relationship.

Also, in the fourth embodiment, when the face direction is predicted, the individual face discrimination may be alternatively carried out by employing this predicted value, the face-direction feature with respect to the specific angle, and the like. For example, while the feature data about the various directions of the respective registered persons have been previously registered, the feature data to be compared in response to the predicted direction are switched so as to discriminate the individual persons. As a result, the process operation may be carried out in a high speed, and the recognition precision may be improved.

Also, in the fifth embodiment, in such a case that three-dimensional coordinate values of feature points cannot be calculated, e.g., the plural cameras cannot be calibrated, a face region may be cut out from calculated feature points so as to calculate a scale "L*" of a judgment by way of the general-purpose template matching method, or the subspace method. The present invention may be realized by adding the above-described modification.

Figure 11:
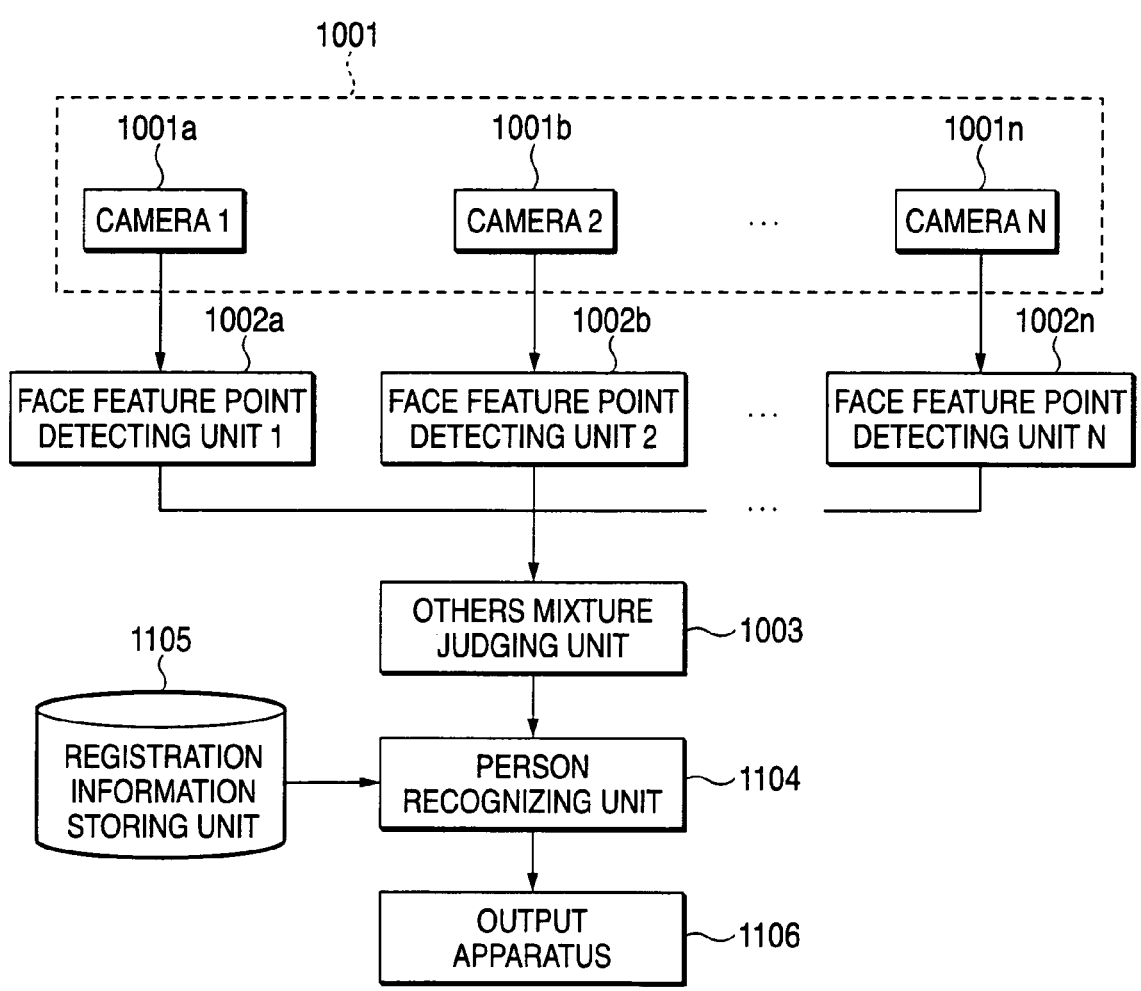
FIG. 11 is a block diagram showing a certification apparatus.

Incidentally, in the fifth embodiment, a modification shown in FIG. 11 may be employed. FIG. 11 is a block diagram showing a certification apparatus to which the face image processing apparatus of FIG. 10 is applied. In addition to the configurations shown in FIG. 10, the certification apparatus 1100 shown in FIG. 11 includes a person recognize unit 1104, a registration information storing unit 1105 and an output apparatus 1106.

The person recognizing unit 1104 works similarly to the person recognizing units described in the first and second embodiments in recognizing specific persons. That is, the person recognizing unit 1104 is configured to recognize a person according to the feature points of faces extracted by the face feature point extracting units 1002a, 1002b . . . 1002n, by comparing the face feature of the person extracted from images of the face feature points with face features of specific persons registered in the registration information storing unit 1105. However, the person recognizing unit 1104 performs the person recognition operation only when the others mixture judging unit 1003 judges that an identical person is indicated. When the others mixture judging unit 1003 judges that an identical person is not indicated on the basis of the face feature points output by the face feature point extracting units 1002a, 1002b . . . 1002n, the person recognizing unit 1104 outputs that judgement result to the output apparatus 1106. The output apparatus 1106 provides a user with the result of recognition by the person recognizing unit 1104. However, when the others mixture judging unit 1003 judges that an identical person is not indicated, the output apparatus 1106 provides the user with the judgement result.

As previously described, in accordance with the present invention, since the various images are acquired by the plural sets of cameras and the features are extracted from these acquired images, such a face image processing apparatus capable of performing the robust face recognizing operation can be carried out. Also, the face image processing apparatus of the present invention can judge the unfair access operation by way of the face photograph, and even when the face feature point cannot be detected due to hiding of this face feature and the shadow, this face image processing apparatus can predict the feature point so as to improve the recognition precision. Also, while the direction of the face of the person to be identified is considered, the face image processing apparatus checks as to whether or not other persons are mixed into the face image processing operation, so that the face direction can be realized in higher precision.

What is claimed is:

1. A face image processing apparatus, comprising:
   a face region detecting unit including a plurality of face region detecting sections each configured to detect a face feature point of a person to be identified from one of a plurality of images picked up by a plurality of imaging units, respectively, to detect a face region;
   a face feature extracting unit including a plurality of face feature extracting sections each configured to extract a face feature from one of the images corresponding to the face region detected by one of the plurality of face region detecting sections;
   a photograph judging unit configured to compare a first face feature extracted by a first one of the plurality of face feature extracting sections with a second face feature extracted by a second one of the plurality of face feature extracting sections to judge whether a photographic subject imaged by the plurality of imaging units is a photograph;
   a person recognizing unit configured to calculate a similarity measure based on a face feature of a specific person being previously registered and a face feature determined from the face features extracted by the face feature extracting sections, to recognize the person to be identified; and
   an output apparatus providing a recognition result received from the person recognizing unit.

2. A certification apparatus, comprising:
   a plurality of imaging units which pick up a plurality of images of a first person, respectively;
   a plurality of face region detecting units each configured to detect a face feature point of the first person from each of the plurality of images to detect a face region corresponding to the face feature point;
   a face feature extracting unit configured to extract a face feature from images each corresponding to the face region detected by one of the plurality of face region detecting units;
   a photograph judging unit configured to judge whether a photographic subject imaged by the plurality of imaging units is a photograph; and
   a person recognizing unit configured to calculate a similarity measure between a face feature of a specific person being previously registered and the face feature extracted by the face feature extracting unit, to recognize the first person;

wherein the face feature extracted by the face feature extracting unit includes a plurality of face features corresponding to the respective images; and the photograph judging unit compares the plurality of face features with each other to judge whether the photographic subject is a photograph.

3. The certification apparatus as claimed in claim 2, wherein the photograph judging unit converts an inclination of one of the plurality of face features to compare the one of the plurality of face features with another one of the plurality of face features.

4. A certification apparatus, comprising:

a plurality of imaging units which pick up a plurality of images respectively;

a plurality of face feature point extracting units each configured to extract a face feature point from one of the plurality of images;

an others mixture judging unit configured to judge whether an identical person is indicated by a first face feature point extracted by a first one of the plurality of face feature point extracting units and a second face feature point extracted by a second one of the plurality of face feature point extracting units; and a person recognizing unit configured to recognize a person according to the first and second face feature points when the others mixture judging unit judges that the identical person is indicated.

* * * * *